(12) United States Patent
Eggleston et al.

(10) Patent No.: US 7,416,164 B2
(45) Date of Patent: Aug. 26, 2008

(54) ELLIPTICAL SEALING SURFACE FOR BUTTERFLY VALVE

(75) Inventors: Philip Wayne Eggleston, Sherman, TX (US); James Leroy Lounsberry, Marshalltown, IA (US); Wilbur Dean Hutchens, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 0 days.

(21) Appl. No.: 11/866,854

(22) Filed: Oct. 3, 2007

(65) Prior Publication Data

US 2008/0035874 A1    Feb. 14, 2008

Related U.S. Application Data

(60) Continuation of application No. 11/421,428, filed on May 31, 2006, now Pat. No. 7,296,585, which is a division of application No. 10/230,656, filed on Aug. 29, 2002, now Pat. No. 7,080,820.

(51) Int. Cl.
*F16K 1/22* (2006.01)
(52) U.S. Cl. .................. 251/174; 251/306; 251/361
(58) Field of Classification Search ............. 251/305, 251/306, 307, 174, 359, 360, 361, 192
See application file for complete search history.

(56) References Cited

U.S. PATENT DOCUMENTS

| | | | | |
|---|---|---|---|---|
| 3,025,035 A | * | 3/1962 | Edward | 251/306 |
| 3,325,142 A | * | 6/1967 | Thompson | 251/306 |
| 4,005,848 A | * | 2/1977 | Eggleston | 251/307 |
| 4,194,749 A | * | 3/1980 | Bonafous | 251/306 |
| 4,399,976 A | * | 8/1983 | Legris | 251/306 |
| 4,505,290 A | * | 3/1985 | Scobie | 251/306 |
| 4,508,315 A | * | 4/1985 | Livorsi et al. | 251/174 |
| 5,178,364 A | * | 1/1993 | Garrigues et al. | 251/306 |
| 5,249,774 A | * | 10/1993 | Mazel et al. | 251/306 |
| 5,685,520 A | * | 11/1997 | Velan | 251/306 |
| 5,934,647 A | * | 8/1999 | Marbach | 251/306 |
| 6,131,882 A | * | 10/2000 | Suzuki | 251/306 |
| 6,142,173 A | * | 11/2000 | Bekeredjian et al. | 251/306 |

\* cited by examiner

*Primary Examiner*—John Bastianelli
(74) *Attorney, Agent, or Firm*—Marshall, Gerstein & Borun LLP

(57) ABSTRACT

A reduced component wear valve is comprised of a valve body having a passage therethrough and a disc attached to a rotatable shafts. The disc is utilized with a seal forming a gap between the disc and the seal proximate to the rotational axis of the disc. When the disc is in the open position, the seal major axis is greater then the disc diameter and they do not touch. As the disc rotates to near closure, the disc perimeter engages the minor axis of the seal (which is smaller than the disc diameter), and the disc stretches the seal in the minor axis direction thus decreasing the major axis such that the gap is closed. The seal can be preformed in an elliptical shape or it can be formed into an elliptical shape by a retaining mechanism. The seal may be a single-piece or a multi-piece assembly press-fit into the valve body. Zero or light disc to seal contact during the majority of the valve disc rotation minimizes valve seal wear and rotational friction.

8 Claims, 16 Drawing Sheets

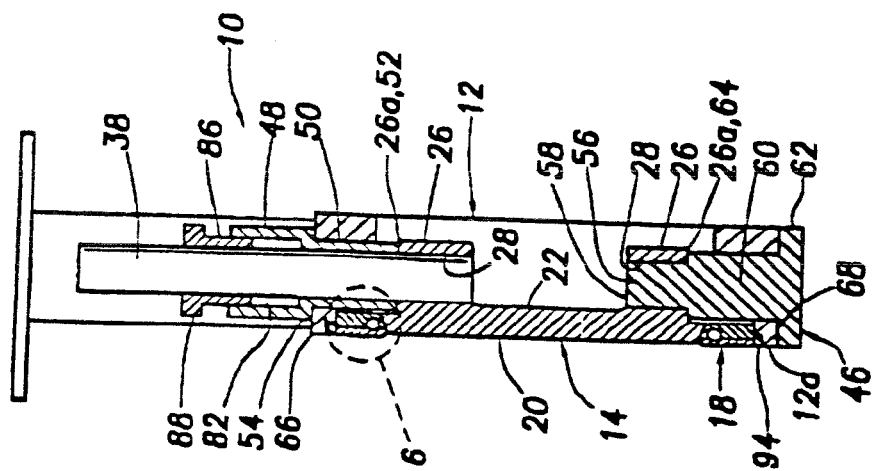
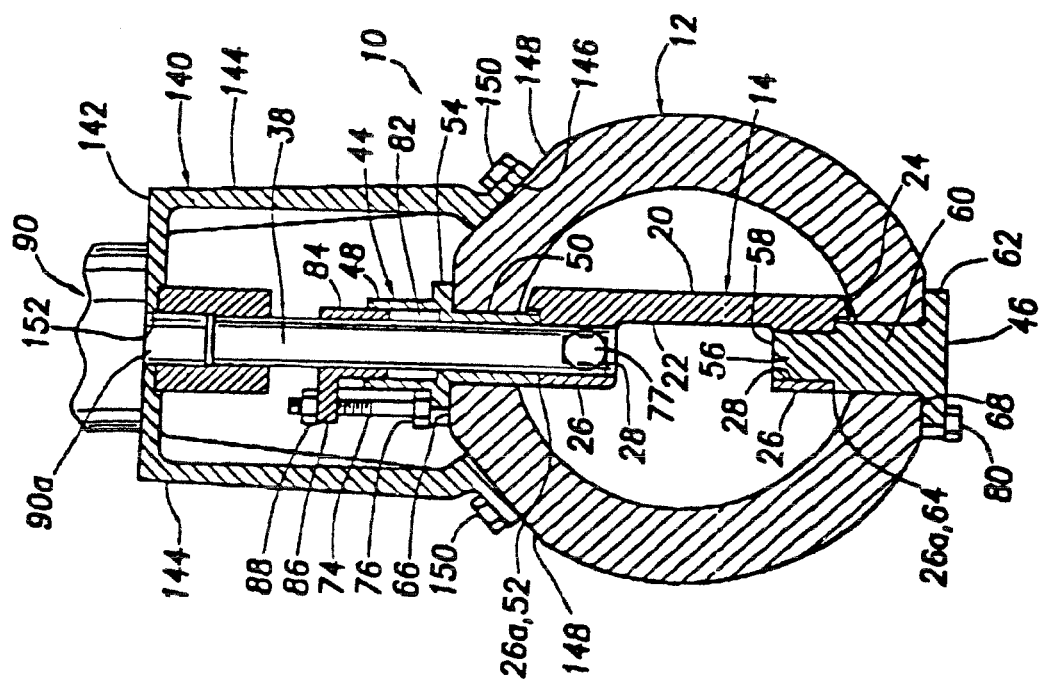
FIG. 5
FIG. 4

ELLIPTICAL SEALING SURFACE FOR BUTTERFLY VALVE

CROSS-REFERENCE TO RELATED APPLICATION

This application is a continuation of U.S. application Ser. No. 11/421,428, filed May 31, 2006, now U.S. Pat. No. 7,296,585, which is divisional of U.S. application Ser. No. 10/230,656, filed Aug. 29, 2002, now U.S. Pat. No. 7,080,820.

FIELD OF TECHNOLOGY

This invention generally relates to rotary or "butterfly" valves and methods for fabricating them, and more particularly to reducing valve friction and improving the valve sealing and wear characteristics.

BACKGROUND

Rotary valves, commonly referred to as "butterfly" valves, are typically provided with a disc which is rotationally drivable between an open position and a closed position about a central axis diametrically extending through the interior of a generally annular valve body. In the open position, the disc permits fluid (low through the valve body. Upon rotation of the disc to the closed position, a peripheral edge of the disc operatively engages an annular seal member portion of an annular seal cartridge structure supported within the valve body, to prevent fluid flow through the valve and associated piping sections.

Rotary valves are often utilized in applications requiring "bi-mode" operations, i.e. where the valve is either open or closed, such as a safety shut-off valve that generally remains open but must close, and disable the flow, during an emergency condition, such as a fire or chemical spill. Another application of rotary valve usage is throttling which regulates the amount of fluid flow per unit of time in a process. Pharmaceutical manufacturing processes, by way of example, typically incorporate throttling rotary valves to deliver precise quantities of the chemical components constituent to a product batch. A sophisticated process control system, such as the pharmaceutical process described above, may further control the throttling rotary valve to regulate the fluid flow in a time varying or cyclical manner. Applications such as these often result in the disc and the seal member remaining in constant sliding contact in relation to one another throughout the control process resulting in increased wear on both components.

While the use and operation of rotary valves in fluid throttling and shut-off applications is well known in the art, the valves are still subject to several well-known problems, limitations, and disadvantages. FIGS. 9 and 10 illustrate a prior art circular disc or circular seal rotary valve, wherein a portion of the circular valve seal along the rotational axis of the valve stem is continually in contact with a portion of the circular disc adjacent to the valve shaft resulting in continuous wear on the valve seal adjacent to the valve shaft. FIG. 9 illustrates a prior art circular rotary valve 206 in a partially open position disposed within a passage 204. FIG. 10 is a cross section of circular valve from FIG. 9 taken along the section line 10-10. The circular rotary valve 206 includes a valve stem 202 rotatable along an axis 200. By rotating the valve stem 202 along the axis 200, in the direction indicated by all arrow 211, the circular disc 203 comes into contact with a circular valve seal 209 to close off a passage 204. A wear area 205 (FIG. 10), located proximate to the axis 200 of the valve stem 202, is in continual engagement with the circular valve seal 209 as the circular disc 203 rotates in relation to the circular valve seal 209. As a result of continual engagement between the circular disc 203 and the circular valve seal 209, wear occurs either on the (disc 203 or on the circular valve seal 209 at the wear area 205 adjacent to valve stem 202. As the distance d between the circular disc 203 and the centerline of the valve seal 209 decreases, the wear area 205 between the circular disc 203 and the circular valve seal 209 increases, thereby increasing the total associated wear. Stated another way, the prior art rotary valve 206 when utilized for actively throttling fluid flow to provide a small percentage of total flow capacity, incurs significant wear as a result of the wiping motion of the circular disc 203 relative to the circular valve seal 209. The presence of abrasive particulates suspended within the fluid may accelerate the wear experienced by the valve seal 209 and disc 203 at the contact area 205.

The wear inherent to this type of circular disc/seal interface often results in reduced seal integrity leading to an inability to completely retard the fluid flow through the rotary valve. The loss of accurate fluid flow control attributable to worn seals may cost a manufacturer substantial sums of money in either lost process control or valve services. As a result, a worn valve must be either repaired or replaced which may cost hundreds of thousands of dollars in material and/or process downtime. For example, shutting down a nuclear reactor to replace a valve or replacing a ruined batch of pharmaceutical product caused by a malfunctioning control valve, can result in significant losses due to lost productivity or product.

Another problem associated with by the prior art rotary valves is overcoming the "break away", friction of the valve, i.e. overcoming the static friction) of the ball or disc required to open, close, or adjust the valve. Typically "high performance" rotary valves, which generally have a large break away friction, require a large initial force to overcome the static friction which can cause valve positioning instability because the large initial force is considerably greater than the force required to overcome the dynamic friction and hence an actuator will likely overshoot the desired setting. It would therefore be desirable to provide a "frictionless" rotary valve that would solve such valve control, problems.

Another problem associated with the prior art rotary valves is the complicated centering and adjustment procedures required to position the disc relative to the valve seal. Because the periphery of the disc is used as the seal contact surface for the valve, it is critical to proper seal performance that the disc be precisely centered within the valve body. Numerous structures have been incorporated into the prior art rotary valve assemblies to address this problem and permit the installed disc to be adjusted within the valve body in a manner effecting this necessary disc centering. This centering adjustment, of course, must be carefully and accurately performed to achieve the desired sealing effectiveness. Adjustment error, on the other hand, can seriously reduce the valve's sealing efficiency.

Another problem associated with the prior art rotary valves is the complicated manner in which an actuator, a motorized device used to rotate the disc between its open and closed positions, is operatively mounted on the valve body. Typical rotary valves include an actuator base structure integrally formed or joined to the valve body and projecting radially outwardly from the valve body. An adaptor structure affixed to the outwardly projecting base structure provides a platform for mounting the actuator to the valve body. This complex mounting and adaptor structure undesirably adds to the overall manufacturing cost and complexity of assembly of the prior art rotary valve.

As highlighted by the foregoing discussion, a need exists for an improved rotary valve assembly, and the fabrication methods associated therewith, to eliminate or substantially reduce the above-mentioned problems, limitations, and disadvantages typically associated with rotary valves of conventional construction. It is desirable to provide a rotary valve having an effective mechanism for providing extended service life. It is a further desirable to reduce the wear between the disc and the sealing surface of the valve over a relatively large range of rotational distances. It is further desirable to provide a rotary valve having enhanced controllability, and substantially no seal engagement and wear until the disc provides substantial closure of the valve passageway, and to provide a simplified mechanism for the mounting of actuators to a valve body.

SUMMARY

In one embodiment a rotary valve includes a generally annular valve body and a seal structure, carried by the valve body, for forming an elliptical disc and elliptical seal interface. A disc is rotatably supported within the valve body and has an elliptical periphery rotatable into and out of sealing engagement with an elliptical sealing surface. The elliptical disc periphery has a generally conical shape which creates an entrance angle on the disc seating surface that provides a variety of operational advantages, such as a reduction in the torque required to overcome the break away friction and unseat the disc from the associated seal structure, and a reduction in the wear experienced by both the disc periphery and the sealing surface. Further, the reduced torque requirement, a smaller valve actuator and associated hardware may be used to seat and unseat the disc relative to the sealing surface. Still further, the elliptical seal and the disc cooperate to provide a wedging effect that allow broader manufacturing tolerances to be employed while improving the overall sealing efficiency of the rotary valve.

Another embodiment of the rotary valve provides for the reduction of wear experienced by the individual valve components. The rotary valve includes a valve body and sealing structure, carried within the valve body, for forming a disc and seal interface which in operation may cooperate to prevent fluid flow through the valve body. The disc is adapted to cooperate with the elliptical seal to form a gap between the disc and the seal proximate to a rotational axis of the round disc. In the open position, the major axis of elliptical seal is greater than the round disc diameter insuring little or no contact between the two components. As the disc rotates to near closure an elliptical face formed on the disc perimeter engages the minor axis of the elliptical seat (which is smaller than the generally circular disc diameter), and the disc distorts the elliptical seal along the minor axis thereby forcing a corresponding decrease along the major axis such that the gap is closed bringing the elliptical seal into sealing contact with the disc proximate to the rotational axis of the disc. The elliptical seal may be pre-formed in an elliptical shape or it may be formed into an elliptical shape by a retaining mechanism. Because the disc and seal are not in contact (or are in very limited contact) through the majority of the valve's range of uses the wear and break away friction are minimized.

Another embodiment of the rotary valve has the seal structure including a retaining mechanism having two facing annular seal cartridge members, and a resilient annular seal member secured there-between. The facing annular seal cartridges formed to create an elliptical cavity sized to engage and receive a portion of the seal member such that the seal member is deformed and held ii an elliptical configuration. The elliptical seal member having a radially inner annular portion, protruding from the facing annular seal cartridge members, into the valve body interior for operative sealing engagement by the disc periphery. Alternatively, the seal member may be formed from a metallic material and received in the elliptical seal cavity between the seal cartridge members.

Another embodiment of the rotary valve has the elliptical seal cavity formed in at least one of the facing annular seal cartridge members by resiliently deforming a circular cartridge member to an elliptical shape and holding the deformed cartridge member in such elliptical shape while at least a portion of the seal cavity is formed on a side of the cartridge member in a circular pattern circumscribing its central axis. The elliptically deformed cartridge member is then released, to thereby permit it to return to its original circular shape. This, in turn, deforms the originally circular seal cavity portion to an elliptical shape conforming to the elliptical shape of the disc periphery.

Another embodiment of the rotary valve has a press-fit seal assembly or annular, one-piece seal providing an interference with a reverse-flow side recess formed within the valve body. The press-fit seal assembly or one-piece seal may further be constructed to include a retaining ridge. The retaining sedge cooperating with the reverse-flow side recess to provide redundant retention in the event of a catastrophic valve failure.

Another embodiment of the rotary valve has the disc precisely centered with respect to the valve body and the seal structure, in automatic response to installation of the disc within the valve body using two guide members having an inserted part inwardly inserted through a pair of suitable openings in diametrically opposite flat portions on the outer periphery of the annular valve body.

The guide members may have an abutment portion on the extended end of the inserted parts corresponding to a disc abutment portion which cooperate to automatically center the disc within the valve body. The positions of the abutment portions relative to the guide members are precisely controlled by external flange portions which abut the diametrically opposite flat portions on the exterior periphery of the valve body. Illustratively, an inner end of one of the guide members is rotatably received in a mounting structure carried on the disc, and a longitudinal portion of a disc-rotating shaft is rotatably extended through the other guide member and is rotationally locked to the mounting portion of the disc.

Another embodiment of the rotary valve includes am actuator support structure secured to the valve body such that the motor-driven actuator may be cheaply and easily coupled to the outwardly projecting disc rotating shaft. Generally, the actuator support structure is of a one-piece construction that is removably secured to the valve body and is directly connectable to a selected actuator. More particularly, the annular valve body may have a circumferentially spaced pair of flat areas formed on the external periphery of the valve body on opposite sides of a longitudinal drive shaft portion projecting radially outwardly from the valve body periphery. Another embodiment of the rotary valve includes a one-piece actuator support structure configured generally inverted U-shaped with a closed outer end portion to which a valve actuator may be directly secured, and a spaced pair of leg portions each having a free end portion. The free end portions being removably secured to the flat area formed on the valve body, thereby securing the actuator and support structure to the valve body.

BRIEF DESCRIPTION OF THE DRAWINGS

FIG. 4 is partial cross-sectional view through the rotary valve assembly taken along line 4-4 of FIG. 2;

FIG. 5 is partial cross-sectional view through the rotary valve assembly taken along line 5-5 of FIG. 1;

DETAILED DESCRIPTION

Figure 1:
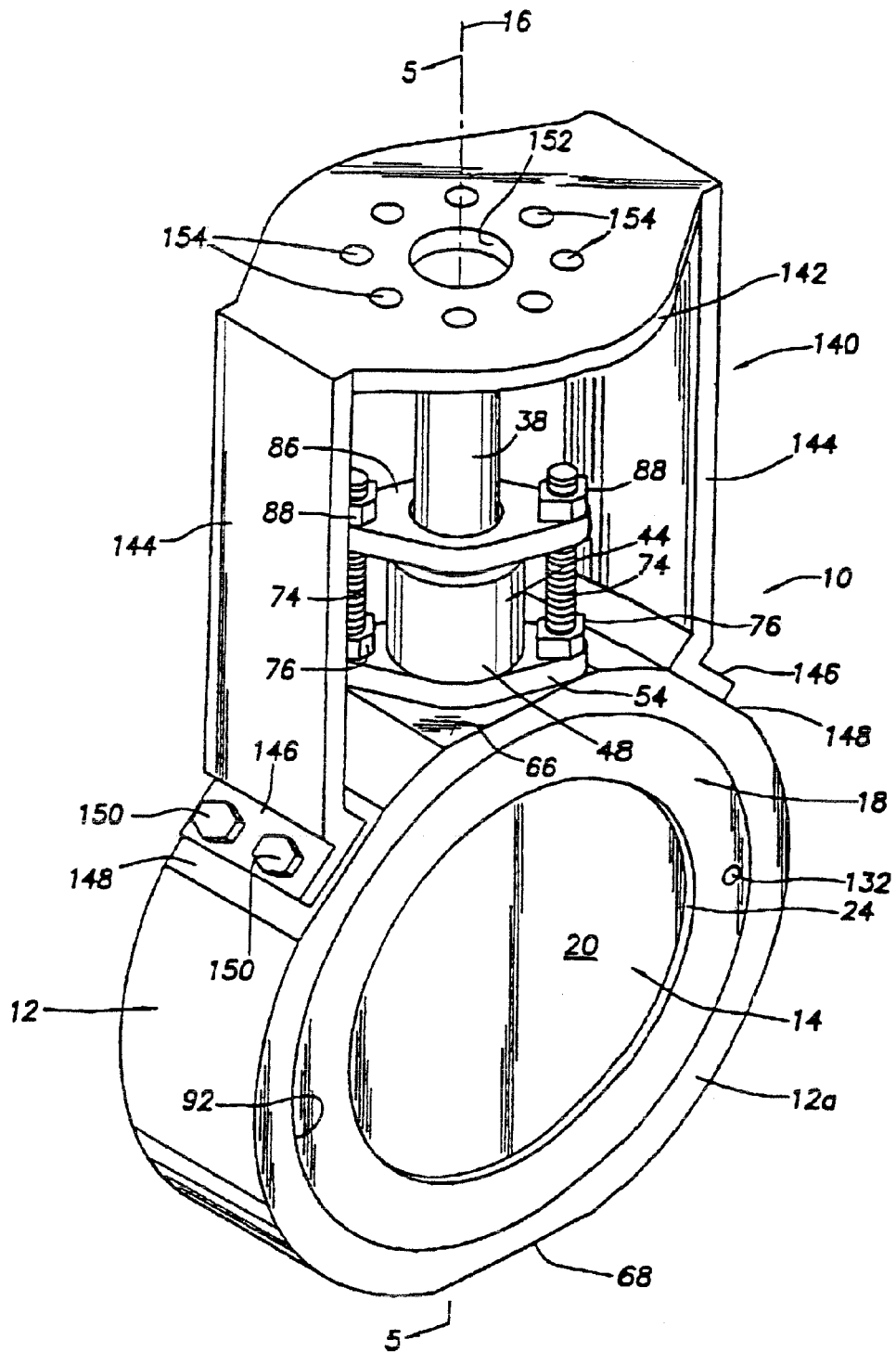
FIG. 1 is a perspective view of a rotary valve assembly in a closed position.
Figure 2:
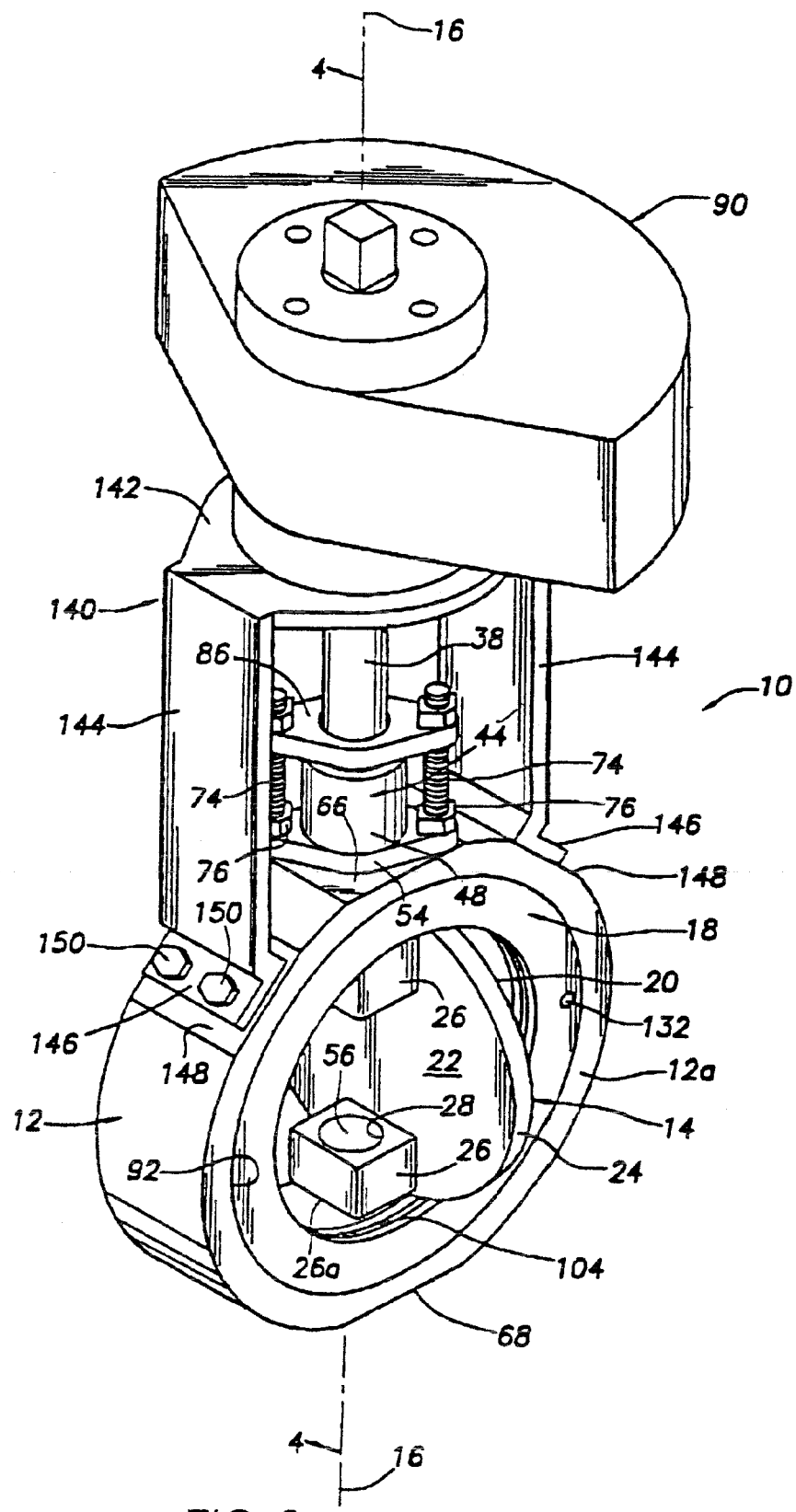
FIG. 2 is a perspective view of the rotary valve assembly in an open position.
Figure 3:
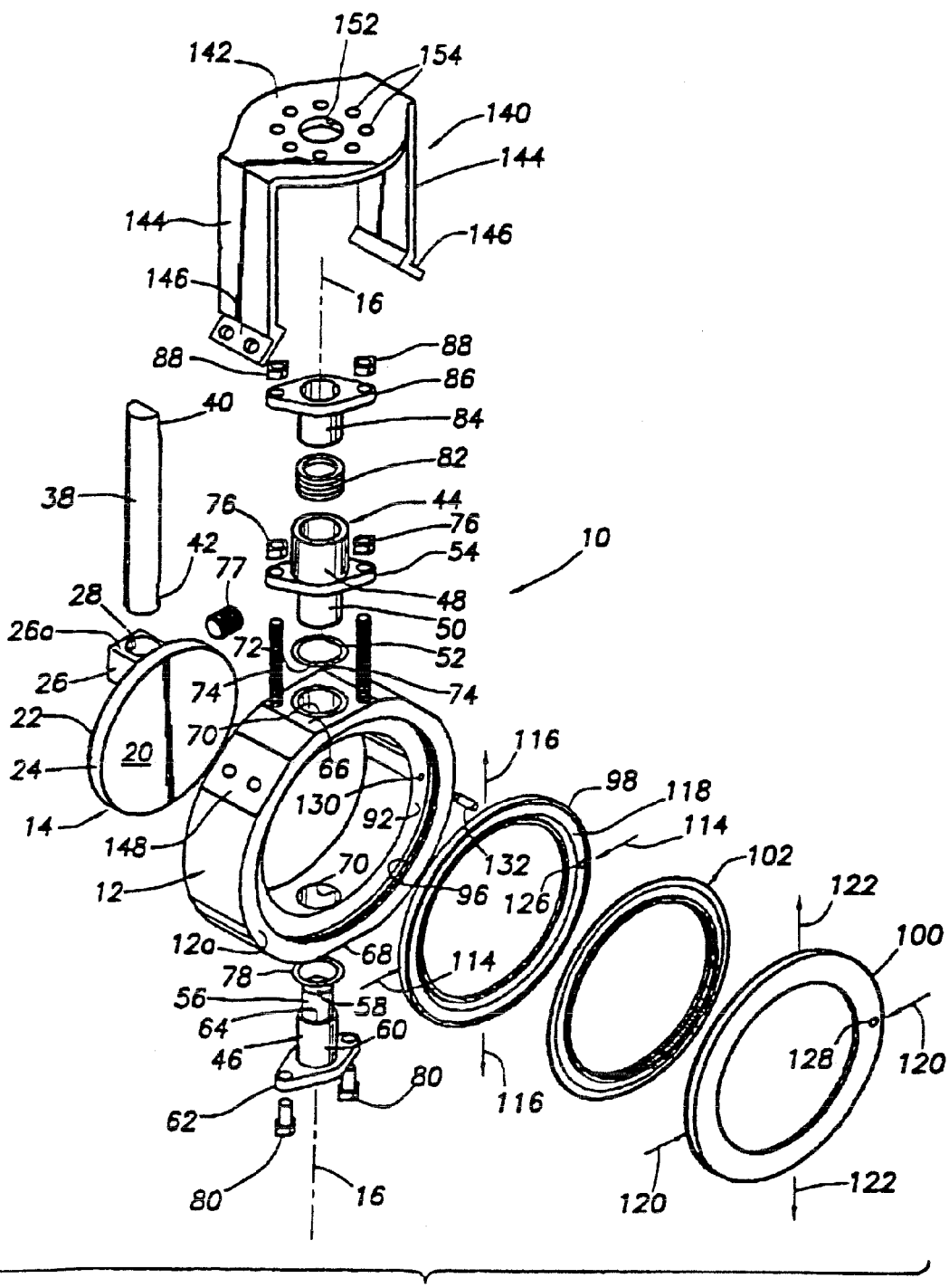
FIG. 3 is an exploded perspective view of the rotary valve assembly.

FIGS. 1-3 illustrate one embodiment of a rotary valve 10, commonly referred to as a "butterfly" valve, including a generally annular metal body portion 12, a metal closure disc 14 rotatable between a closed position and an open position (respectively illustrated in FIGS. 1 and 2) about an axis 16 extending diametrically through the body portion 12, and all annular seal cartridge structure 18. FIG. 1 illustrates the disc 14 in the closed position cooperating with the seal cartridge structure 18 to prevent fluid flow through the interior of the body portion 12 and the piping sections (not shown) operatively connected to its opposing sides. Alternatively, illustrated in FIG. 2 is the disc 14 in the open position, such that fluid flow through the interior of the valve body 12, and piping operatively coupled to the valve body 12, is permitted.

Figure 7:
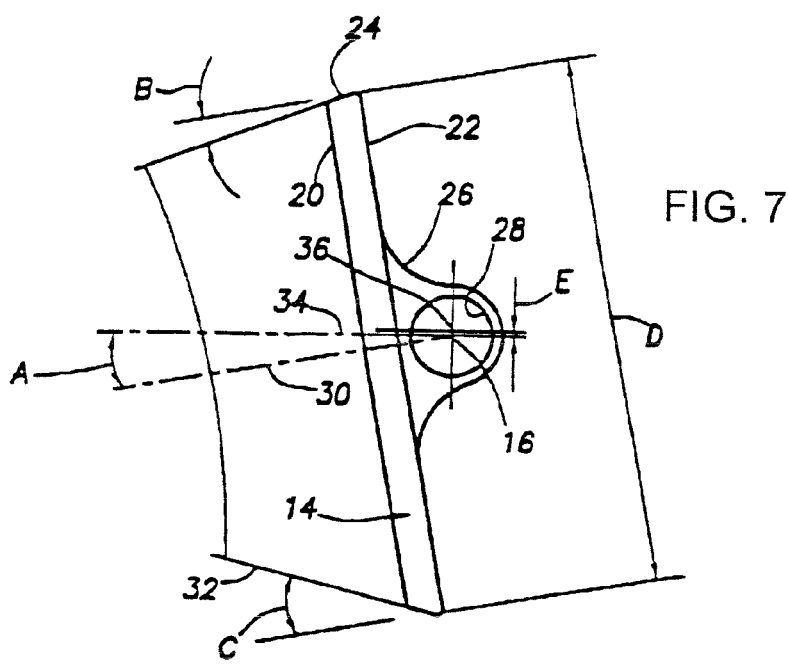
FIG. 7 is an side view of a valve disc portion of the rotary valve assembly.
Figure 8A:
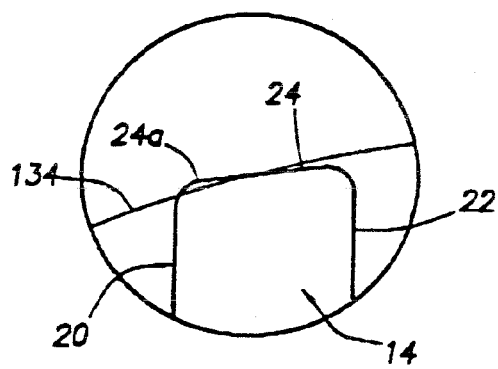
FIG. 8A is a detail view of the circled area "8A" in FIG. 8.
Figure 8:
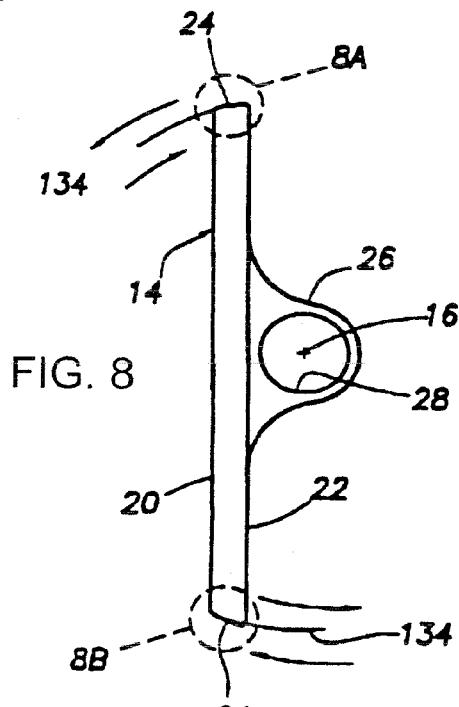
FIG. 8 is a side view of the completed valve disc.
Figure 8B:
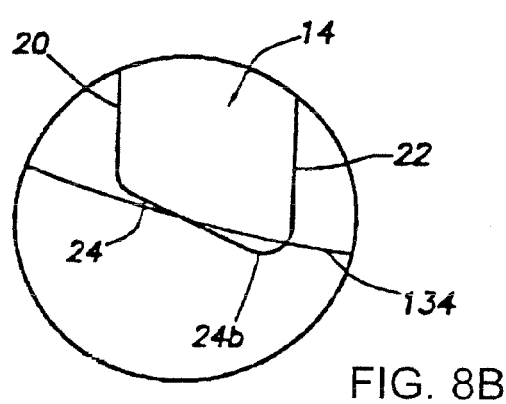
FIG. 8B is a detail view of the circled area "8B" in FIG. 8.
Figure 9:
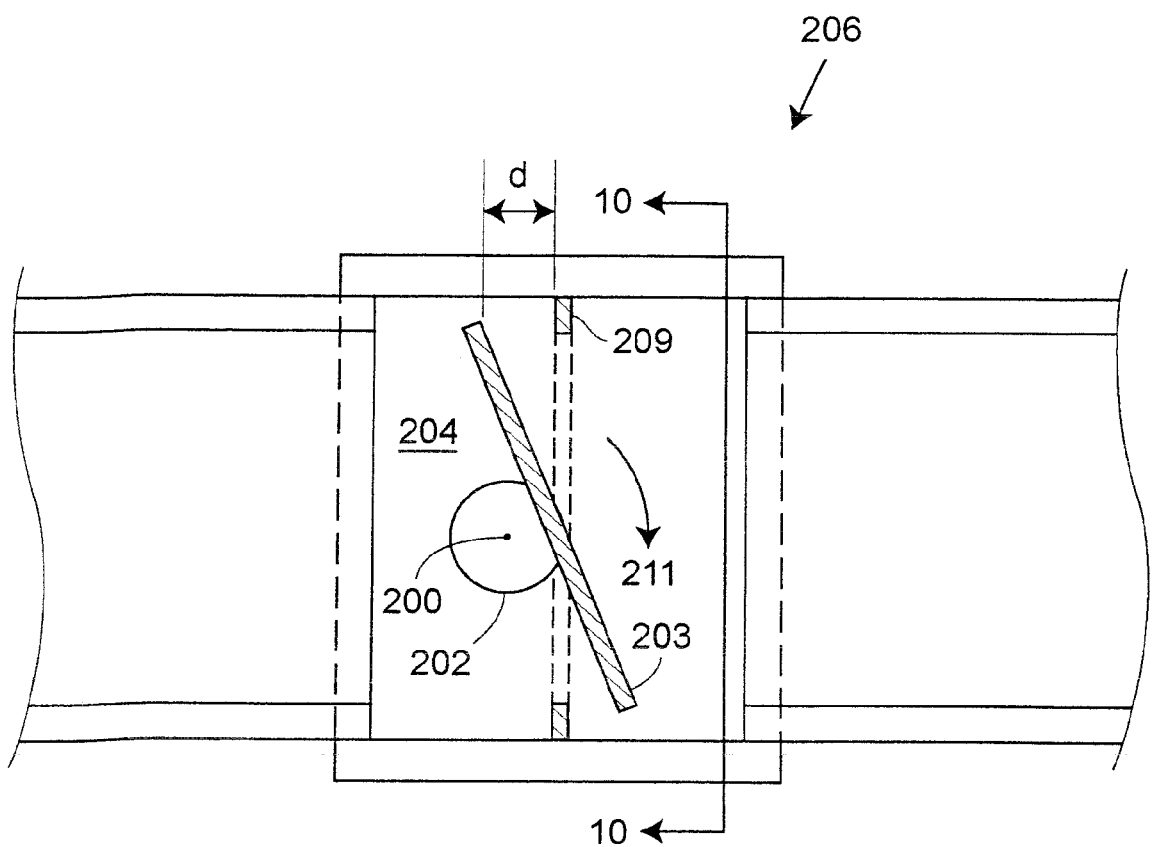
FIG. 9 is a cross sectional view of a prior art rotary valve.
Figure 10:
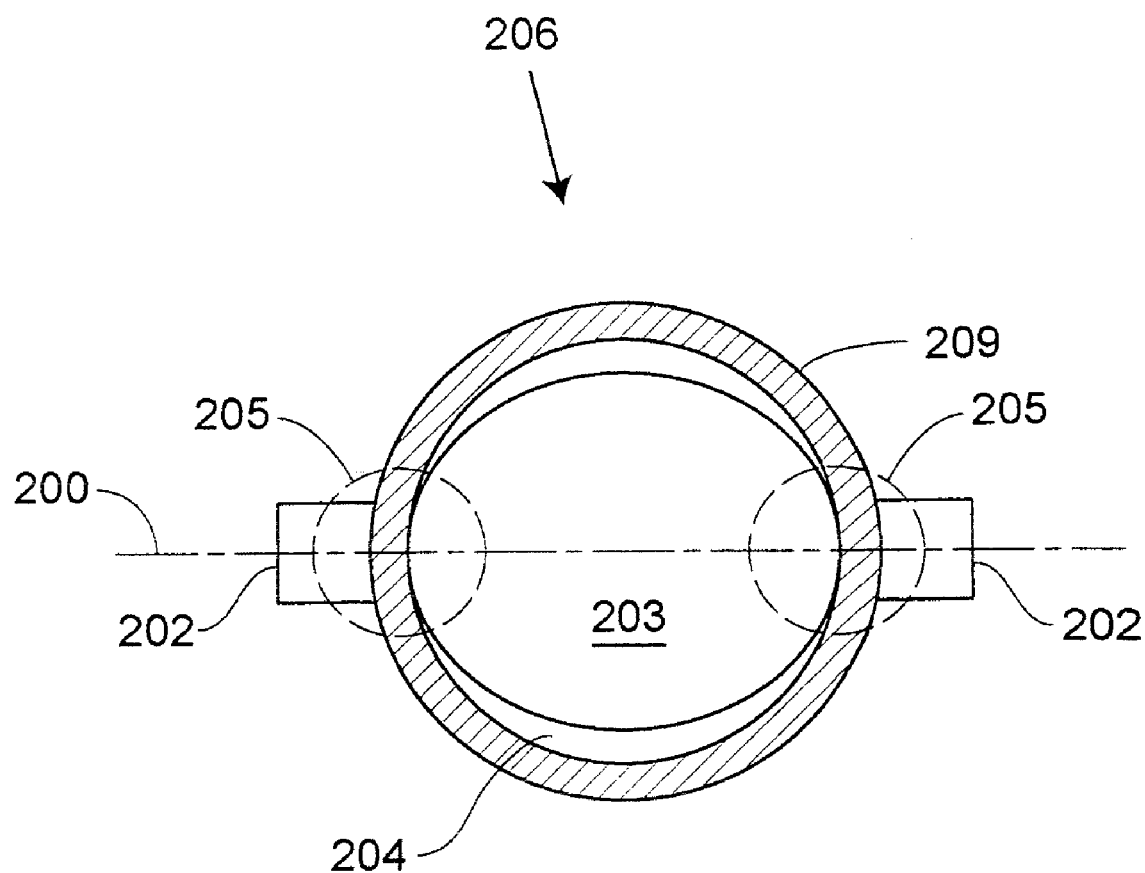
FIG. 10 is a cross-sectional view of the prior art rotary valve in FIG. 9 along line 10-10 with the valve partially open.

Turning to FIGS. 7-8B, the disc 14 has a body portion with a front or outer side 20, a rear or inner side 22, and a peripheral sealing edge portion 24. A diametrically spaced pair of attachment bosses 26 (illustrated in FIG. 2) extend outwardly from the rear side 22 and have aligned, circularly cross-sectioned bores 28 extending through oppositely facing outer side surfaces 26a of the bosses 26 (as illustrated better in FIGS. 2-3). The outer side surfaces 26a are equidistant from the centerline of the body portion of the disc 14.

FIG. 7 illustrates exemplary embodiment of the disc 14 having a centerline 30, and formed (by appropriately machining its outer edge) as a segment of a cone 32 having an axis 34 tilted at a relatively small angle A relative to the disc body centerline 30. The angle of the cone 32, by way of example, is approximately 34°, and the machining tilt angle A is approximately 8°. This machining of the body of the disc 14 as a segment of the cone 32 gives the peripheral sealing edge portion 24 of the disc 14 an elliptical shape in which the major rear side diameter D of the circular disc body, which extends transversely to the disc rotational axis 16, is greater than the minor rear side diameter of the disc 14 which extends parallel to the disc rotational axis 16.

The machining of the disc 14 as a segment of the cone 32 results in portions of the disc periphery 24 adjacent opposite ends of the major diameter D having different slope angles from the rear side 22 of the disc body to the front side 20 of the disc body. Representatively, an upper portion of the disc periphery 24 (as viewed in FIG. 7) slopes outwardly and radially inwardly at an angle B of approximately 15° and a lower portion of the disc periphery 24 (as viewed in FIG. 7) slopes outwardly and radially inwardly at an angle C of approximately 31°. A bore centerline 36 of the attachment bosses 26 may be offset a small distance E from the rotational axis 16 of the disc 14 to effect a "camming" action with respect to the disc as it moves between the closed and open positions.

FIGS. 1-5 illustrate the disc 14 rotatably mounted within the annular valve body 12 and automatically centered using a cylindrical shaft 38 and upper and lower cylindrical guide members 44, 46. The cylindrical shaft 38 has a pair of flats 40, 42 formed on upper and lower end portions thereof (illustrated in detail in FIG. 3). The upper guide member 44 is of a hollow tubular configuration and has an upper body portion 48, a reduced diameter lower body portion 50 having a lower end 52, and an elongated transverse mounting flange 54 disposed at the junction of the body portions 48, 50. The lower guide member 46 has a cylindrical upper body portion 56 with an upper end 58, an enlarged diameter cylindrical lower body portion 60, and an elongated transverse mounting flange 62 at its bottom end. An upwardly facing annular shoulder 64 is defined at the juncture of the upper and lower body portions 56, 60.

FIGS. 3-5 further illustrate the annular valve body portion 12 having an upper flat portion 66 formed diametrically opposite a lower flat portion 68, and having circular bores 70 formed there-through and spaced apart along the disc rotation axis 16. The upper and the lower flat portions 66, 68 are positioned on the valve body 12 such that they are equal radial distances away from the centerline of the body 12.

The disc 14 is mounted within the interior of the valve body 12 by placing the bosses 26 within the interior of the valve body 12 and inserting the tubular lower end portion 50 of the upper guide member 44 downwardly through an annular gasket 72, the upper circular bore 70 and into the interior of the valve body 12. Contemporaneously with the mounting of the upper guide member 44, the upper end portions of a pair of threaded studs 74 pass upwardly through a corresponding pair of mounting holes disposed in opposing ends of the flange 54. When the flange 54 bottoms out on the upper flat area 66, a pair of nuts 76 are threaded onto the studs 74 to secure the flange 66 adjacent to the upper valve body flat area 66. The lower end portion of the shaft 38 is slidable through the upper guide member 44 and the bore 28 of the upper disc boss 26, and is adapted to be secured in place within the upper disc boss 26 by a set screw 77 threaded into a corresponding opening in the upper disc boss 26 and forced against the lower shaft, flat area 42. FIG. 4 illustrates the lower end 52 of the lower body portion 50 of the upper guide member 44 abutting the upper side surface 26a, of the upper disc boss 26.

The upper end portion 56 of the lower glide member 46 is passed upwardly through an annular gasket 78 and the lower valve body circular bore 70 into the circular bore 28 disposed in the lower disc boss 26 until the lower guide member flange 62 abuts the lower flat area 68 formed into the annular valve body 12. The flange 62 is secured to the flat area 68 via a pair of bolts 80 extended upwardly through corresponding holes in the flange 62 and threaded into aligned holes in the valve body 12. The mounting of the upper and the lower guide members 44, 46 in this manner supports the disc 14 within the valve body 12 for rotation relative thereto about the rotational axis 16.

The above-described mounting of the upper and the lower guide members 44, 46 serve to automatically center the disc 14 within the valve body 12 relative to the annular seal cartridge structure 18. The centering is accomplished without the necessity of subsequent adjustments to the installed disc 14 relative to the valve body 12 or the annular seal cartridge structure 18. In practice, automatic disc centering may be achieved by axially configuring the upper and lower cylindrical guide members 44, 46 in such a manner such that they are operatively secured to the valve body 12 as described above, and the distance between the lower end 52 of the upper guide member 44 and the annular flange portion 64 of the lower guide member 46 is precisely identical to the distance between the oppositely facing outer sides 26a of the disc bosses 26 (which are representatively equidistant from the centerline of the disc body). In this manner, because the distances between the valve body upper and lower flat areas 66, 68 are identical, the disc 14 is automatically centered within the valve body 12 by the abutments 26a, 52 and 26a, 64 between the guide members 44, 46 and the disc bosses 26, when the guide member flanges 54, 62 respectively abut the valve body flat areas 66, 68.

The shaft 38 extends upwardly through all annular packing structure 82 (illustrated for clarity in FIG. 3) received within the upper body portion 48 of the upper guide member 44. Shaft 38 also passes upwardly through and beyond a tubular packing retainer member 84 telescoped within the upper body portion 48 and having a transverse flange portion 86 on its upper end. The studs 74 pass upwardly through corresponding holes in the outer ends of the flange 86, with the packing retainer member 84 being held in place with nuts 88 threaded onto the upper ends of the studs 74. An upper end portion or the shaft 38 is operatively connected to a conventional motorized actuator 90 (illustrated in FIG. 2) operatively associated with the valve body 12 via a one-piece actuator support bracket 140. The actuator 90 may be selectively utilized to rotate the shaft 38 about the disc rotation axis 16 to thereby rotate the disc 14 between its FIG. 1 closed position and its FIG. 2 open position.

FIGS. 1-6A illustrate various aspects of the seal cartridge structure 18. In one embodiment, the seal cartridge structure is complementarily and removably received within an annular recess 92 (illustrated in detail in FIG. 3) formed in a side 12a of the valve body 12 mid is captively retained within the recess 92 by means of a snap ring 94 (illustrated in FIG. 5) removably received in an annular groove 96 (illustrated in FIG. 3) in the valve body recess 92. FIG. 3 further illustrates the seal cartridge structure 18 including a flat annular metal seal support member 98, a flat annular metal seal retaining member 100, and an annular seal member 102 sandwiched between the members 98 and 100.

Figure 6:
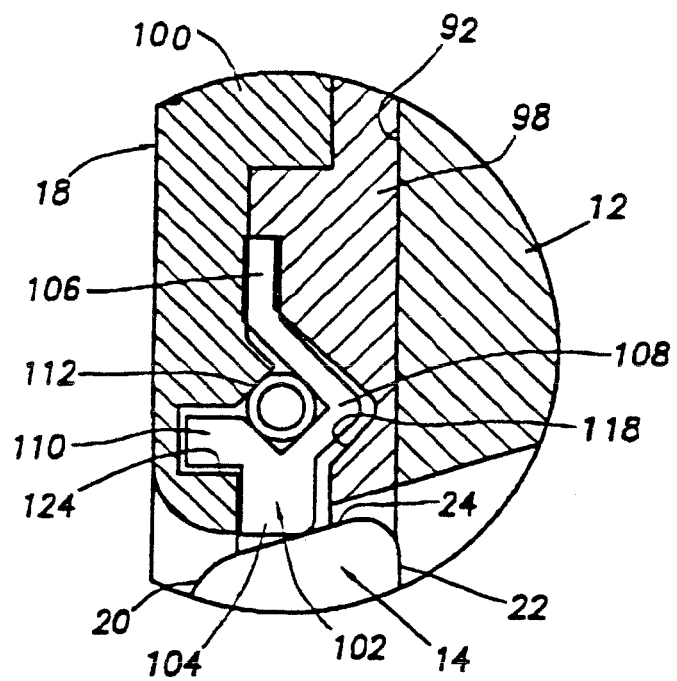
FIG. 6 is an enlarged cross-sectional view of the circled area "6" in FIG. 5.

In one embodiment, the annular seal member 102 is substantially identical to the seal member 24 illustrated and described in U.S. Pat. No. 4,005,848 to Eggleston and comprises an annular TEFLON® body having (as best illustrated in FIG. 6) an annular, radially inner sealing portion 104; an annular, radially outer peripheral portion 106; an annular, axially inwardly projecting flexible web portion 108; and an annular, axially outwardly projecting lip portion 110. An annular resilient garter spring member 112 outwardly circumscribes the annular sealing portion 104 and exerts thereon a radially inwardly directed resilient biasing force.

In another embodiment, the seal member 102 is held by the balance of the seal cartridge structure 18 to cause the sealing portion 104 of the seal member 102 to assume an elliptical shape corresponding to the elliptical configuration of the peripheral edge 24 of the disc 14 to provide substantially improved valve sealing performance as later described herein.

In order to hold the originally round annular seal member 102 in an elliptical configuration the seal support member 98 is retained in a suitable clamping structure and is subjected to diametrically opposite, radially inward directed clamping forces 114 (see FIG. 3) that resiliently deform opposite edge portions of the seal support member 98 radially inward, while at the same time correspondingly and resiliently deforming the member 98 radially outwardly in directions 116 transverse to the clamping forces 114, thereby giving the seal support member 98 an elliptical configuration.

While the seal support member 98 is being held in this resiliently deformed elliptical configuration, a circular seal receiving depression 118 (illustrated in FIG. 3) is suitably machined on one side of the deformed seal support member 98. The temporarily clamped seal support member 98 is then released to permit it to return to original circular configuration, thereby causing the circular depression 118 to assume an elliptical configuration in the finished inner seal, support member 98 (illustrated in FIG. 6).

Furthermore, the seal retainer member 100 is placed in the clamping structure and subjected to diametrically opposite, radially inwardly directed clamping forces 120 (illustrated in FIG. 3) that resiliently deform opposite edge portions of the seal retaining member 100 radially inwardly, while at the same time correspondingly and resiliently deforming the member 100 radially outwardly in directions 122 transverse to the clamping forces 120, thereby giving the seal retaining member 100 an elliptical configuration. A circular depression 124 (see FIG. 6) is formed in the side of the seal retaining member 100 which will face the seal support member 98 while the seal retaining member 100 is held in this elliptical configuration. The seal retainer member 100 is then released from the clamping structure to return to its original circular configuration, thereby causing the circular depression 124 to assume an elliptical configuration in the finished inner seal support member 98.

Suitable marks (not shown) are placed on each of the completed seal support and retainer members 98, 100 so that when the seal member 102 is operatively sandwiched therebetween, the elliptical depressions 118, 124 may be precisely aligned. When the seal member 102 is operatively sandwiched between the seal support and retainer members 98, 100 as illustrated in FIG. 6, the seal portion 108 is received in the elliptical depression 118, the seal portion 110 is received in the depression 124, and the seal portion 106 is clamped between facing portions of the seal support and retainer members 98 and 100, with an inner peripheral portion of the seal member sealing portion 104 projecting radially inwardly beyond the inner peripheries of the seal support and retainer members 98 and 100. The annular seal member 102 is installed within the elliptical depressions 118 and 124, by slightly deforming the seal member 102 from its originally round configuration to an elliptical configuration which geometrically matches the elliptical shape of the periphery 24 of the disc 14. The resulting assembled seal cartridge stricture 18 retains the inwardly projecting periphery of the seal member sealing portion 104 in the desired elliptical configuration.

With the seal support and retainer members 98, 100 rotationally aligned with one another, the completed seal cartridge structure 18 is installed in the valve body side recess 92 (as illustrated in FIGS. 1-3) in a manner such that aligned holes 126, 128, illustrated in FIG. 3, in the seal support and retainer members 98, 100 are aligned with an underlying hole 130 in the axially inner surface of the valve body seal cartridge recess 92 to thereby align the major axis of the now elliptical seal portion, 104 with the major axis of the elliptical disc periphery 24 when the disc is rotationally driven to its FIG. 1 closed orientation. To retain the installed seal cartridge structure 18 in this operative orientation, a retaining pin 132 is operatively positioned in the aligned holes 126, 128, and 130.

When the disc 14 is rotationally driven between its open and closed positions, as indicated by the directional arrows in FIG. 8, the elliptical disc periphery 24 is driven through the rotational arc 134 illustrated in FIGS. 8-8B to cause the indicated portions 24a, 24b of the disc periphery 24 to be selectively wedged into sealing engagement with the radially inner periphery of the resilient seal portion 104 (illustrated FIG. 6) and then be disengaged therefrom.

The exemplary mating of the elliptical disc 14 and the seal surfaces 104 (illustrated in FIG. 6) in the valve 10, result in a number of advantages such as reducing the torque required to seat and unseat the disc 14 from the associated seal element when compared to the conventional torque requirements of a round disc seating against a round seal element. Additionally, there is less wear on the disc and seal element. Further, the reduced operational torque requirements, the parts carrying the activation load may be smaller, and a smaller actuator may be used to seat and unseat the valve disc against the seal. Still further, broader manufacturing tolerances may be utilized in conjunction with the disc and seal due to the compensation and wedging effects provided by the elliptical seal and disc interface.

FIGS. 6B-6E illustrate alternate embodiments of the seal cartridge structure 18 and the complementary annular seal member 102 and retainer member 100 assembled without the need for a separate snap ring 94, as described above. The alternate embodiments of the seal cartridge structure 18 provide for a press-fit seal assembly 300, 320, 340, and 360 positioned within a reverse-flow side recess 92a manufactured in the valve body 12. The reverse-flow side recess 92a and the alternate embodiments, discussed below, may be formed in a variety of shapes to provide an elliptical seal. For example, the reverse-flow side recess 92a may be formed having an elliptical shape such that a round seal, when position within the recess, is forced to assume the elliptical profile; alternatively, the reverse-flow side recess 92a may be formed circular, as previously described, and the seal may be formed with an elliptical shape.

Figure 6A:
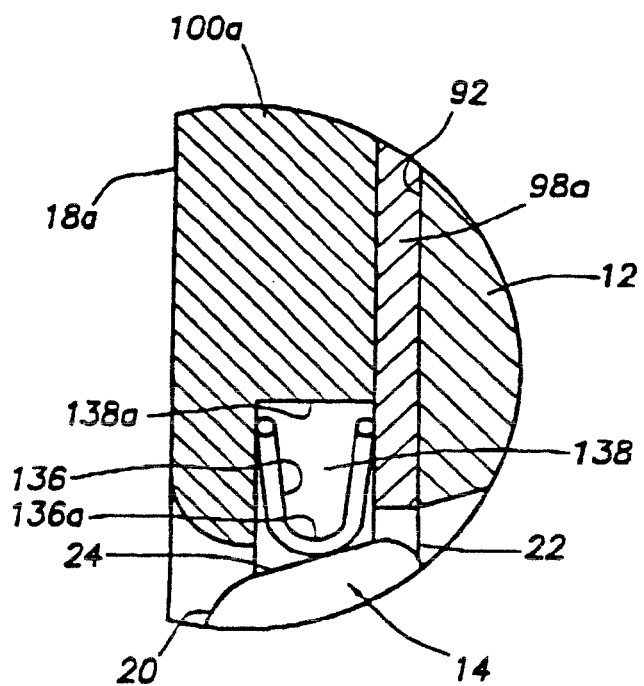
FIG. 6A is a cross-sectional view similar to that in FIG. 6, illustrating another embodiment of the seal cartridge portion.
Figure 6B:
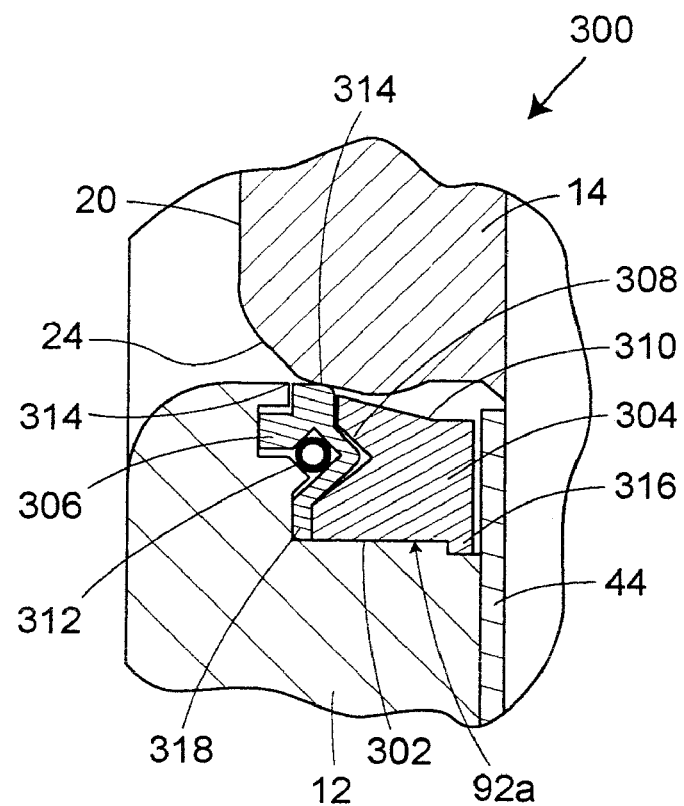
FIGS. 6B-6E are cross-sectional views similar to that in FIG. 6A, illustrating embodiments of a press-fit seal assembly.

FIG. 6B illustrates an embodiment of the press-fit seal assembly 300 pressed into the reverse-flow side recess 92a such that an interference is created between the outer diameter 302 of the press-fit seal retainer 304 and the reverse-flow side recess 92a. The interference may be created by manufacturing the outer diameter 302 of the press-fit seal retainer 304 slightly larger (generally between three and six thousandths of an inch, 0.003"-0.006") than an inner diameter of the reverse-flow side recess 92a. The press-fit seal retainer 304, generally having the larger outer diameter, may be mechanically forced into the reverse-flow side recess 92a such that the smaller inner diameter of the reverse-flow side recess 92a slightly compresses the press-fit seal retainer 304. In this manner, the press-fit seal retainer 304 and an associated seal member 306 may be locked into position within the reverse-flow side recess 92a. The assembly of the press-fit seal assembly 300 is accomplished from the reverse flow side of the rotary valve 10. During operation of the valve 10, additional support may alternately be supplied by the guide members 44, 46 and the valve body 12 depending the direction of fluid flow through the valve body 12.

Further support may be supplied by the interactions between the seal member 306 geometry and the press-fit seal retainer 304. The seal member 306 includes a peripheral portion 308 cooperating with a receiving portion 310 formed in the press-lit seal retainer 304. The seal member 306 further cooperating with the resilient spring 312 to counter the movement of the disc periphery 24 relative to the seal surface 314. The press-fit seal retainer 304 may further include a retaining ridge 316 adapted to provide controlled compression of the gasket portion 318 of the seal, member 306.

Figure 6C:
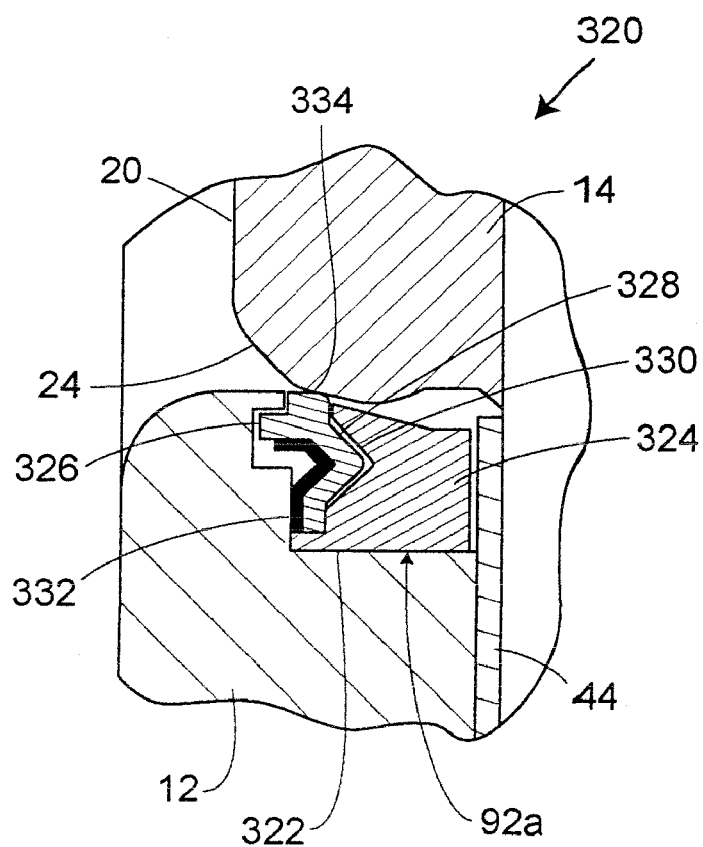

FIG. 6C illustrates an embodiment of a press-fit seal assembly 320 generally assembled to provide an interference between an outer diameter 322 of the press-fit seal retainer 324 and the reverse-flow side recess 92a, as described above. Further support may be supplied by the interactions between the seal member 326 geometry 10 and the press-fit seal retainer 324. The seal member 326 includes a peripheral portion 328 cooperating with a receiving portion 330 formed in the press-fit seal retainer 324. The seal member 326 further cooperates with a resilient spring 332 conforming to a surface distal to the receiving portion 330. The resilient spring 332 is positioned to resist the outward radial forces generated by the movement of the disc periphery 24 relative to the seal surface 334.

Figure 6D:
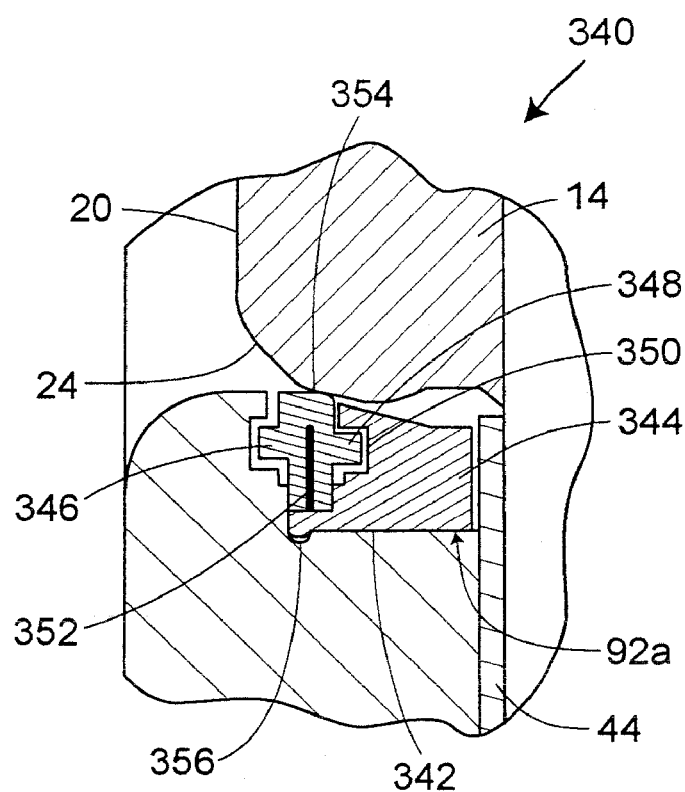

FIG. 6D illustrates an embodiment of the press-fit seal assembly 340 generally assembled to provide a press fit interference between an outer diameter 342 of the press-fit seal retainer 344 and the reverse-flow side recess 92a, as described above. Further Support may be supplied by the interactions between, the seal member 346 geometry and the press-fit seal retainer 344. The seal member 346 includes a peripheral portion 348, having a substantially rectangular configuration, the peripheral portion 348 cooperating with a substantially rectangular receiving portion 350 formed in the press-fit seal retainer 344.

The seal member 346 configured to cooperate with a flat resilient spring 352 encapsulated within the seal member 346 and positioned generally parallel the disc 14 in the closed position as illustrated in FIG. 1. The flat spring 352 positioned to resist the outward radial forces generated by the movement of the disc periphery 24 relative to the seal surface 354. The seal member 346 further including a retaining ridge 356 adapted to provide additional retention of the press-fit seal assembly 340 relative to the valve body 12.

Figure 6E:
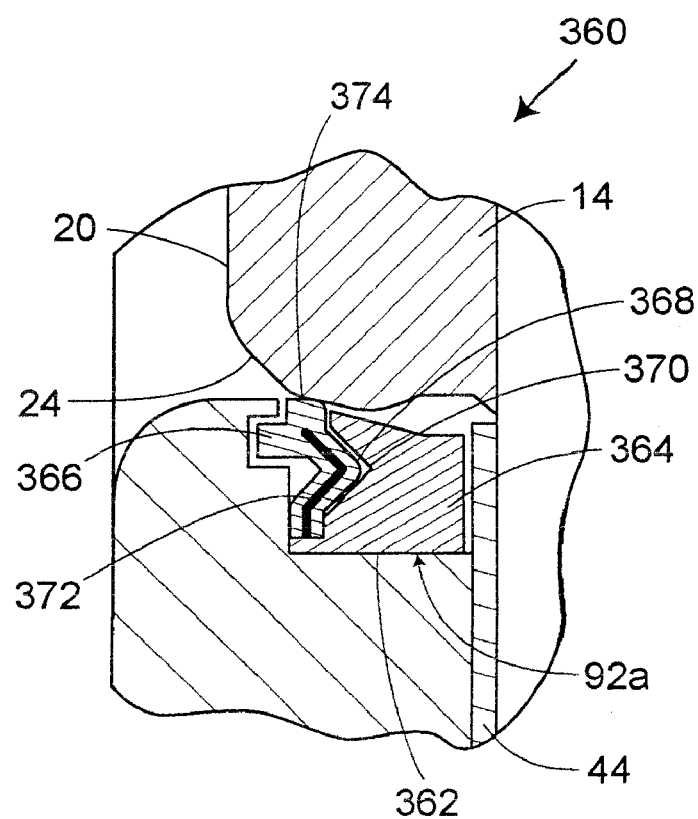

FIG. 6E illustrates an embodiment of a press-fit seal assembly 360, similar to the press-fit seal assembly 320 illustrated in FIG. 6C, generally assembled to provide an interference between the outer diameter 362 of the press-fit seal retainer 364 and the reverse-flow side body recess 92a, as described above. Further support may be supplied by the interactions between the seal member 366 geometry and the press-fit seal retainer 364. The seal member 366 includes a peripheral portion 368 cooperating with a receiving portion 370 formed, in the press-fit seal retainer 364. The seal member 366 further including a resilient spring 372 encapsulated within the seal member 366 and formed substantially parallel to the receiving portion 370. The resilient spring 372 positioned to resist the outward radial forces generated by the movement of the disc periphery 24 relative to the seal surface 374.

FIG. 6A illustrates ala embodiment of a seal cartridge structure 18a including a deformable annular metal seal element 136 having a generally U-shaped cross-section around its periphery. The seal element 136 is sandwiched between modified flat annular seal support and retainer members 98a, 100a which are operatively received and retained within the valve body side recess 92, with a rounded, radially inner annular portion 136a of the metal seal member 136 projecting inwardly from the seal support and retainer members 98a, 100a for operative sealing engagement by the disc periphery 24.

In constructing the seal cartridge structure 18a, the seal support member 98a may be left in its original flat annular configuration, and the seal retainer member 100a may be resiliently deformed to an elliptical shape, by clamping it at diametrically opposite portions as previously described for the seal retainer member 100. At this time, a circular depression 138 is machined into the inner side surface of the seal retainer member 100a on a radially inner peripheral area thereof. When the resiliently deformed seal retainer member 10a is unclamped, it springs back from an elliptical configuration to its original circular configuration to thereby reconfigure the circular depression 138 in a manner such that its outer peripheral surface 138a has an elliptical shape. An annular metal seal, 136 is captively retained in the depression 138 of the assembled seal cartridge structure 18a, such that forcible engagement of the seal portion 136a by the disc periphery 24 deforms the seal 136 into the elliptical shape bounded by the elliptical recess surface 138a, thereby providing the valve 10 with the elliptical disk/seal interface. The modified seal cartridge structure 18a provides advantages similar to those discussed above in conjunction with the flexible TEFLON® seal structure 102 illustrated in FIG. 6.

Figure 6F:
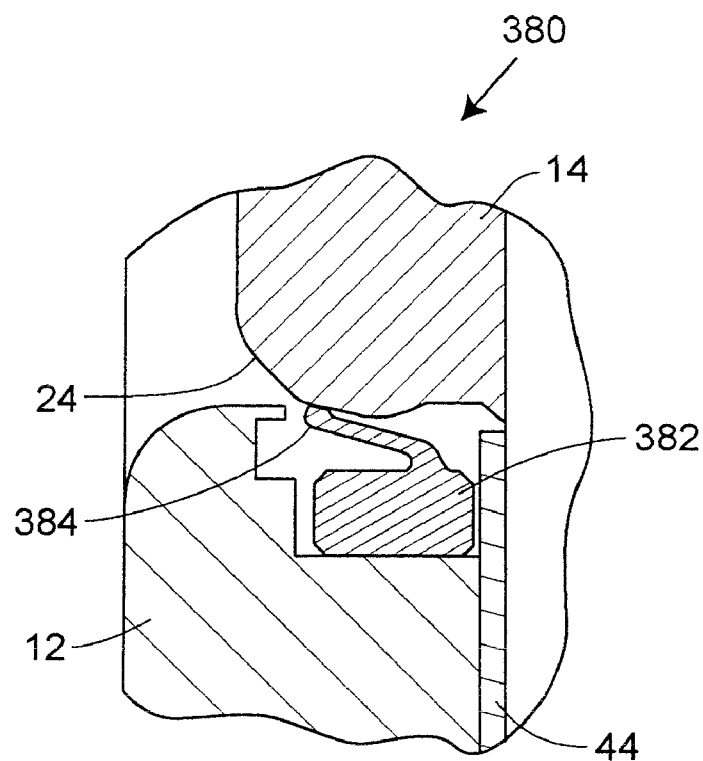
FIGS. 6F-6H are cross-sectional views similar to that in FIG. 6A, illustrating embodiments of an annular metal seal.
Figure 6G:
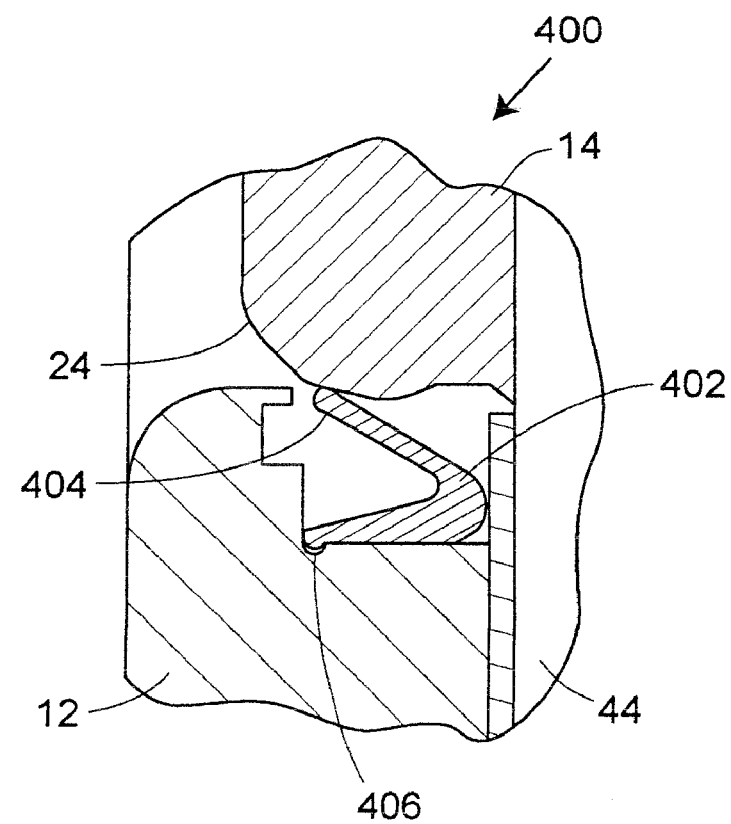
Figure 6H:
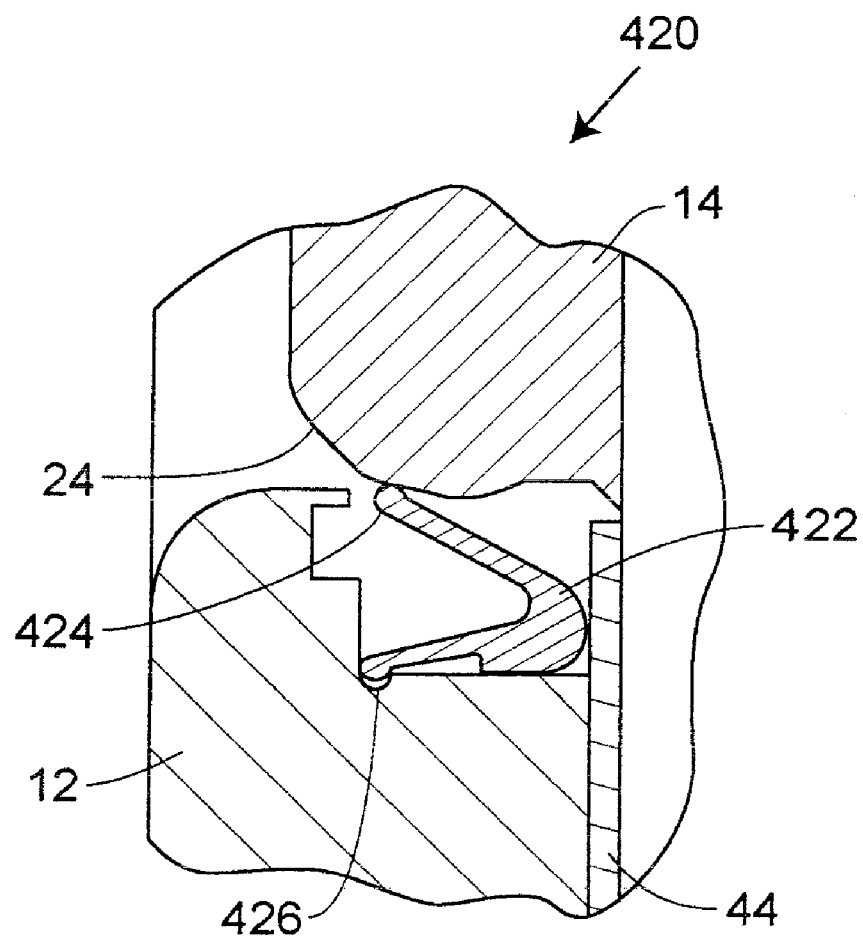

FIGS. 6F-6H illustrate alternate embodiments of the annular metal seal 136 generally indicated by the numerals 380, 400, and 420. An annular, one-piece metal seal 380, 400 and 420 may be interchangeable with the press-fit seal assemblies 300, 320, 340, and 360 illustrated in FIGS. 6B-6E. The one-piece metal seal 380, 400 and 420 utilize a press-lit assembly, as described above, to insure that continuous contact is maintained between the one-piece metal seal 380, 400, and 420 and the valve body 12. The one-piece metal seal 380, 400, and 420 includes a base portion 382, 402 and 422 pressed into contact with the valve body 12 to provide an interference. The one-piece metal seal 380, 400, and 420 further includes a flexible am portion 384, 404 and 424 in sliding contact with the disc 14. The flexible arm portion 384, 404 and 424 may be manufactured in a variety of configurations and materials to provide constant contact between the one-piece metal seal 380, 400, and 420 and the disc periphery 24.

During operation of the valve 10, the one-piece metal seals 380, 400, and 420 may be contained by the either of the guide members 44, 46 and the valve body 12, depending the direction of fluid flow and the pressure gradient, through the valve body 12. Further, the metal seals 400 and 420 may incorporate the retaining ledge member 406 and 426 to provide redundant retention against slippage or other movement in the event of a catastrophic failure of the metal seals 400 and 420.

FIGS. 1-4, in addition to illustrating the self-centering disc support and elliptical disc and seal interface features, also illustrate a structure for substantially simplifying and reducing the cost of the rotational driving interconnection between the motor-driven actuator 90 (illustrated in FIG. 2) and the shaft 38 and thus the disc 14. The one-piece actuator support bracket 140, generally described above, is removably securable to the valve body 12 and may be customized to operatively mount motor-driven actuators of a variety of types and configurations and permit them to be drivingly coupled to the shaft 38.

The actuator bracket 140 has a generally inverted U-shaped configuration with a top end support plate portion 142, and a pair of substantially parallel leg plate portions 144 each having an outwardly angled foot portion 146 that may be removably secured, with suitable fasteners such as bolts 150, to a pair of flat portions 148 located on opposite sides of the top flat portion 66 on periphery of the valve body 12. Alternatively, the actuator bracket 140 may be welded to the valve body 112, or otherwise suitably anchored thereto.

The top plate 142 is suitably drilled, as illustrated at openings 152 and 154, to accommodate the particular motor-driven actuator (for example, the actuator 90 illustrated in FIG. 2) used in conjunction with the balance of the valve 10. Accordingly, a single actuator bracket may be used as a universal mount structure to operatively couple a variety of differently configured actuators to a given rotary valve 10. The actuator 90, by way of further example, is operatively mounted atop the top end plate 142 (illustrated in FIG. 2) and a rotational output portion 90a (as better illustrated in FIG. 4) of the actuator 90 extends downwardly through the central upper end plate opening 152 and is drivingly coupled to the upper end of the shaft 38.

The actuator support stricture feature described above eliminates the need to supply and utilize additional intermediate bracket structures between a base support structure, formed integrally with the valve body 12, and the selected actuator. This component reduction simplifies the valve body 12 design allowing it to be produced from various materials, depending on the valve flow media, without changing the bracket material.

Figure 11:
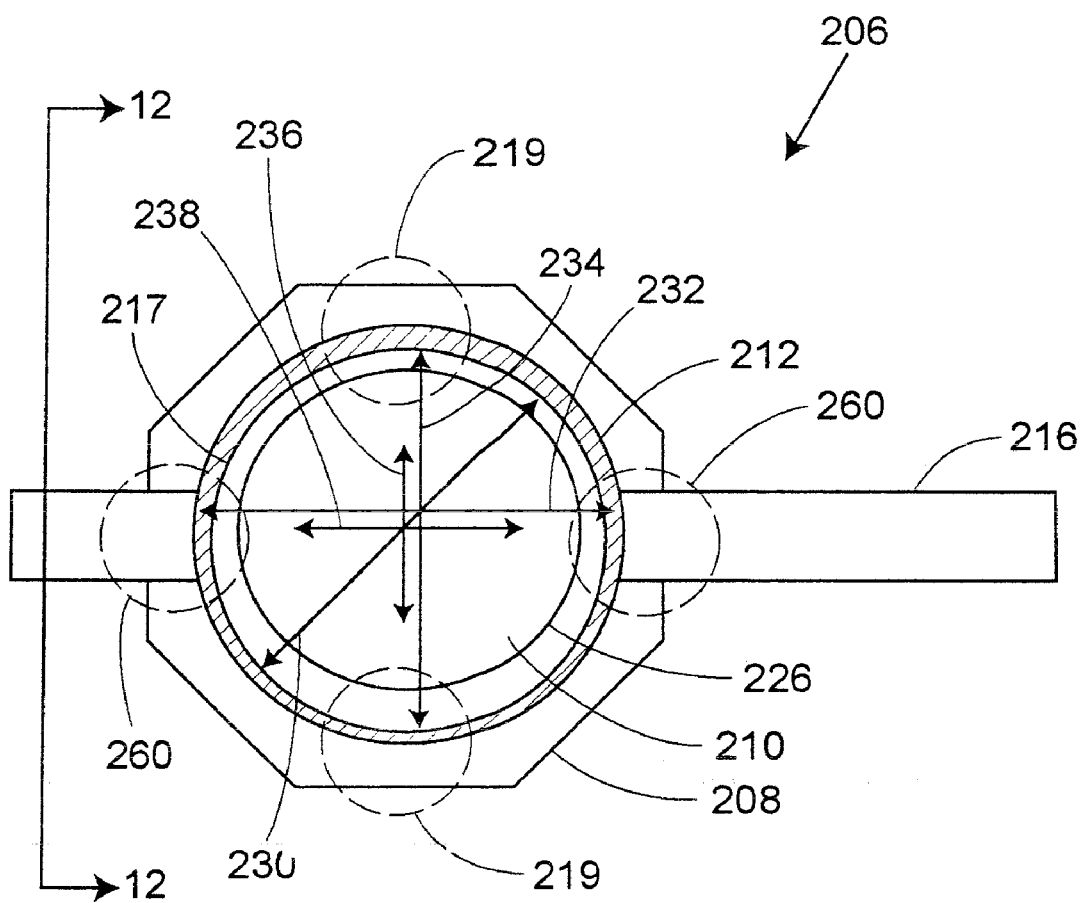
FIG. 11 is a cross-sectional view of another embodiment of the rotary valve.
Figure 12:
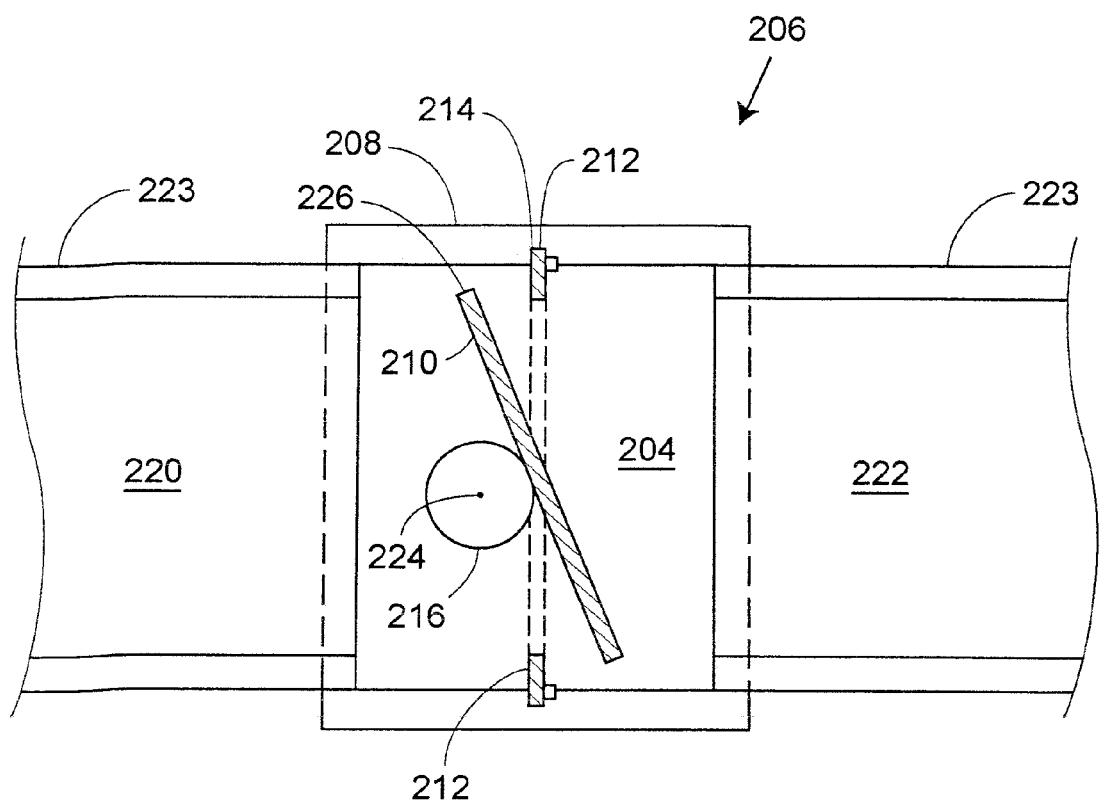
FIG. 12 is a cross-section of the rotary valve of FIG. 11 along line 12-12.

FIGS. 11 and 12 are illustrative of the rotary valve 206, specifically a "butterfly" valve, having reduced component wear and reduced breakaway friction. FIG. 11 illustrates the rotary valve 206 including the valve body 208 and the disc 210 to close the passage in the valve body 208. The disc 210 has a sealable surface on plug periphery 226 and when plug 210 rotates with the shaft 216 it engages the seal 212 only upon closing the passage. In an exemplary embodiment a round disc 210 and an elliptical seal 212 are utilized, wherein a gap 217 is present between the disc 210 and the seal 212 proximate to the rotational axis 224 (illustrated in FIG. 12) of the disc 210 and a "greater than normal" interference is present in interference area 219. Thus, when the disc 210 is in the open position, a major axis 232 of the elliptical seal 212 (oriented parallel to the rotational axis 224 of the shaft 216) is greater than a minor axis 238 of the disc 210 and the seal 212 does not touch or only lightly contacts the disc 210. As the disc 210 rotates to near closure, the disc periphery 226 engages a minor axis 234 of the elliptical seal 212 (which is smaller than the disc diameter 230), and the disc 210 stretches the seal 212 in the minor axis 234 direction thereby decreasing the major axis 232 such that the gap 217 is closed and seal 212 engages the disc 210 proximate to the rotational axis 224 of the disc 210.

Another embodiment of the rotary valve 206 includes the valve seal 212 formed in a "more elliptical shape" than the disc 210, where again the major axis 232 of the seal 212 is dimensionally greater than a major axis 236 of the disc 210 proximate to the shaft 216. Thus, the disc 210 would be less elliptical than the seal 212. As described above, when the disc 210 rotated towards the "closed position" the disc periphery 226 engages and stretches the seal 212 perpendicular to the shaft 216 and dimensionally shrinks seal major axis 232 reducing a gap area 260 to zero gap. The gap area 260 between the seal 212 and the disc 210 is reduced to an interference with the disc 210 such that the seal 212 conforms to the periphery 226 of the disc 210 (the seal 212 is not illustrated in the stretched configuration in FIG. 11). As a result of this configuration, the disc 210 does not engage the seal 212 (as illustrated) until the passage is substantially obstructed by the disc 210 and the seal 212 only provides substantial contact pressure on the disc periphery 226 when the disc 210 substantially closes the passage.

FIG. 12 illustrates the rotary valve 206 having a valve body 208 constructed from a metallic material. Polymer based housings may also be utilized for specific applications. The specific diameter of an inlet 220 and an outlet 222 may be selected based upon the desired fluid flow through the valve. The inlet 220 and the outlet 222 may be connected a plurality of associated piping 223 by respective flanges or threads (not shown). It is contemplated, however, that a variety of inlet and outlet connections may be provided.

The volume of fluid flowing through the valve 206 is regulated by the radial tilt or positioning of the disc 210. In one exemplary embodiment, the disc 210 is shaped generally as a circular planar disc described by the diameter 230. It is contemplated that other embodiments of the disc 210 could be a hemisphere or any other sealable shape. For example, the disc 210 could be an elliptical shape ball of any degree and not depart from the scope of the described embodiments. Butterfly valves, their assembly, applications, and functionality are well known by those having skill in the art, thus, the variety of different features, optional shapes and configurations of components for rotary valves will not be discussed in detail herein although many different valve designs may be utilized with the present invention.

The disc major axis 236 may be mounted substantially perpendicular to the shaft 216. The disc major axis 236 engages the seal 212 in interference area 219. The sealable surface on the disc periphery 226 is typically manufactured smooth such that when the disc periphery 226 engages with the seal 212, a leak proof valve 206 is accomplished. The seal 212 may be formed from a variety of ductile materials. A metallic material, such as stainless steel, is typically preferred, however, the seal 212 may be manufactured to utilize many different materials. The seal material selection largely depends on the type of fluid that will come into contact with the seal 212. A corrosive fluid will require a corrosion resistant seal. Likewise, a high temperature fluid will require a high temperature seal. Most importantly, the seal 212 should be flexible and have spring like or resilient qualities such that the seal 212 is deformable, yet robust enough to withstand sliding contact with the disc 210 as the disc 210 cycles through rotations and/or opens and closes.

In another embodiment the seal 212 fits in a seat 214. The seat 214 may be formed by a recess in the valve body 208. The seat 214 may be machined, forged, welded, threaded or cast into valve body 208. Typically, the seal 212 has a retaining mechanism such as the seal support member 98 and the flat annular metal seal retaining member 100 (as illustrated in FIG. 3).

Figure 13:
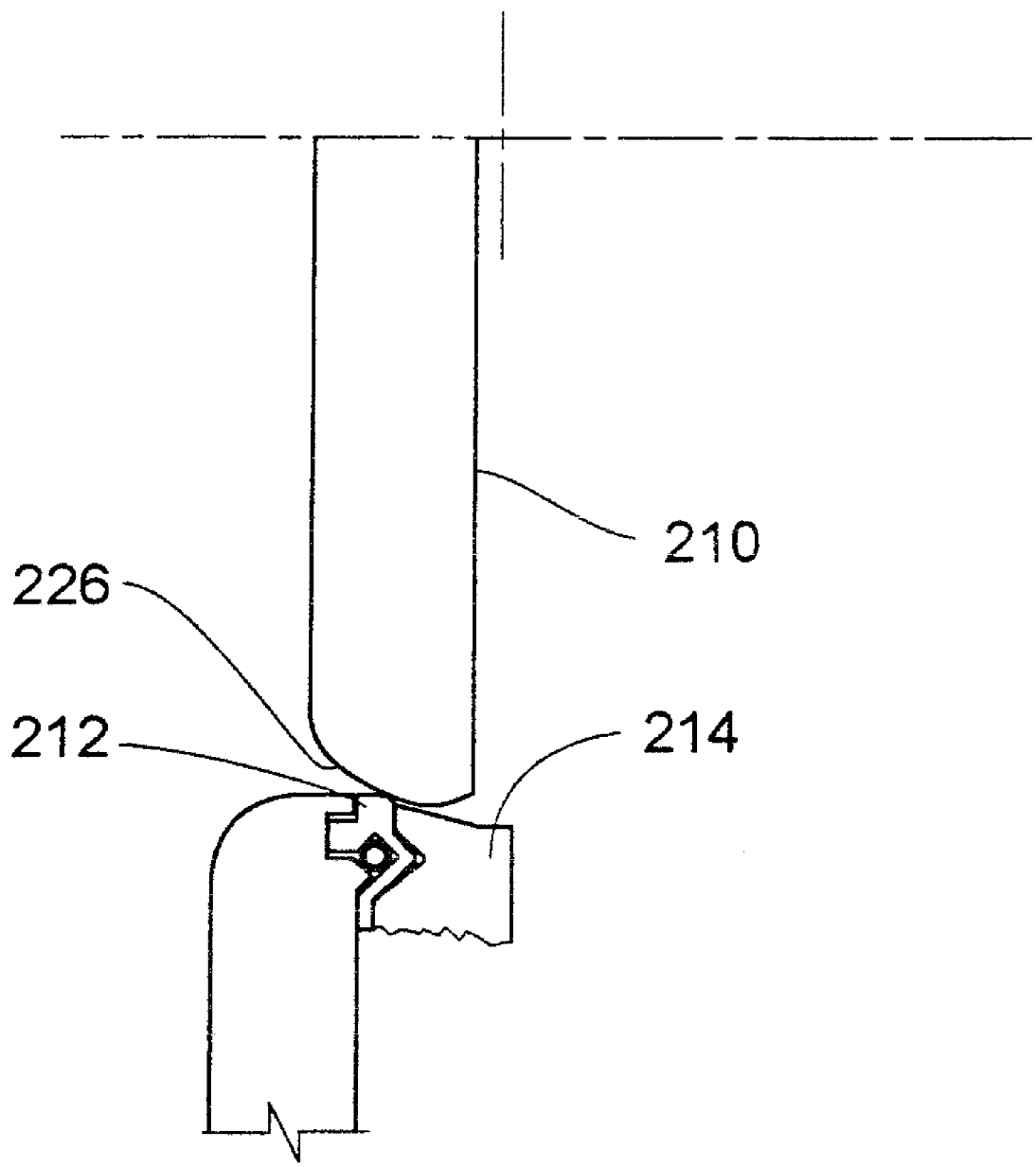
FIG. 13 is an enlarged view of half an elliptical seal and disc interface.
Figure 14:
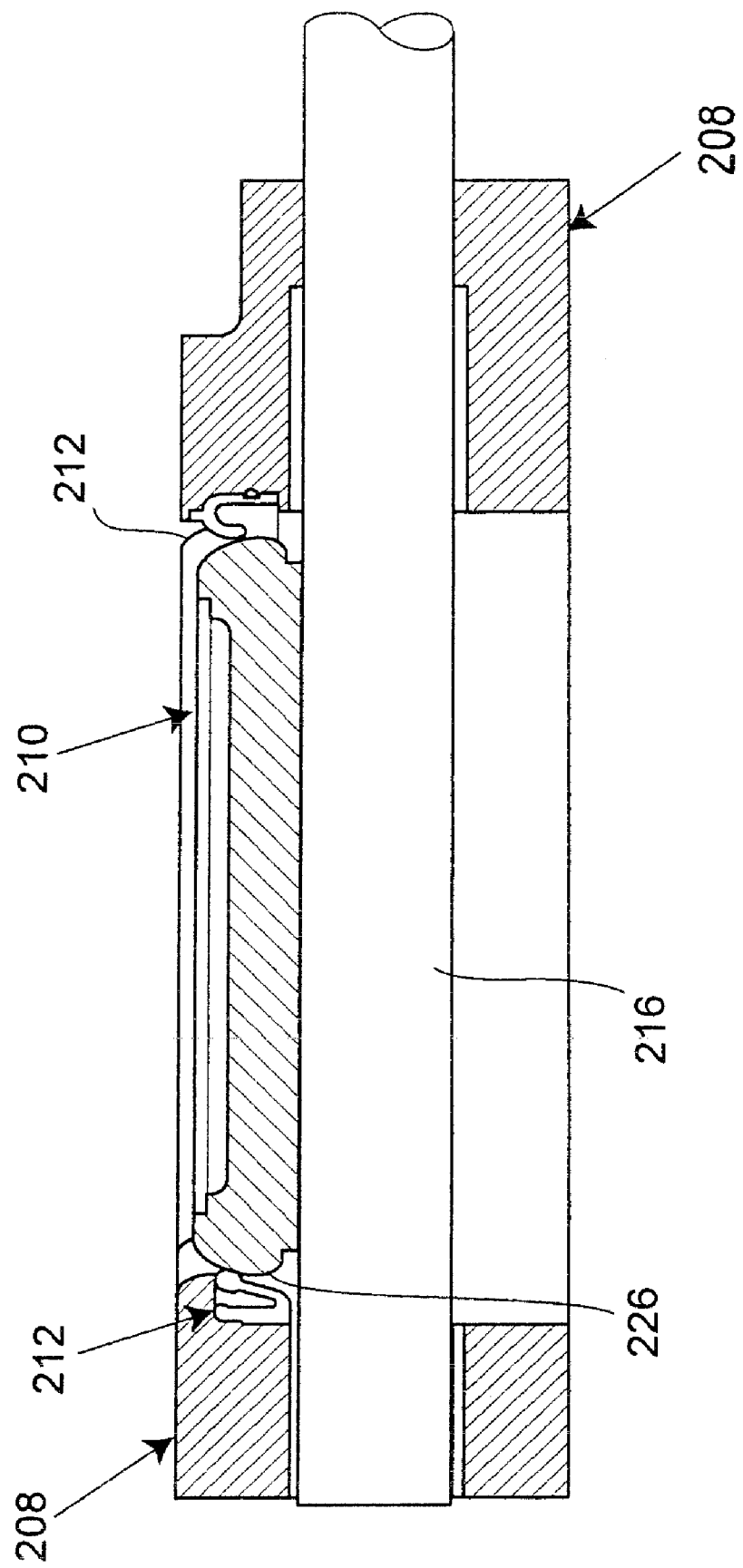
FIG. 14 is an enlarged view of the elliptical seal and disc interface.

FIGS. 13 and 14 are cross-sectional views of sealing and seal retention/forming embodiments. In FIGS. 11-14 like elements have like reference numerals. As illustrated in FIGS. 13 and 14 grooves or recesses are typically utilized to appropriately secure, shape or form the seal 212 with the help of a retailing mechanism such as a snap ring 94 or the seal support member 98 and the flat annular metal seal retaining member 100 illustrated in FIG. 3.

Formation of the seal 212 into an elliptical shape within the body can be accomplished by many methods. The seal 212 may be manufactured in an oval shape (elliptical) or it may be manufactured in round shape. The seal 212 may have a circular outside shape or circumference and an elliptical inner shape or circumference. When seal 212 is manufactured in a round inner shape, the seal 212 must be elliptically deformed as it is inserted into the valve seat 214 of valve body 208. Deformation of the seal 212 to an elliptical shape can also be accomplished for example, by an elliptically shaped valve seat previously identified as 92, and 92a. Thus, the inside circumference of seal remains relatively constant, but its shape is distorted elliptically.

Many methods of seal retention and formation are available and known to those having skill in the art and would not part from the scope of the present invention. The disc 210 may include a slight chamfer to improve sealable surface long the disc periphery 226, vary the rate of engagement, and reduce possible damage to seal. A chamfer or radius on the scalable surface along the disc periphery 226 provides a larger seating area between the disc 210 and the seal 212 upon passage closure by the disc 210. A greater sealing surface area provides a more robust seal.

The "inner" circumference of the seal 212 is slightly smaller than the "outer" circumference of the disc 210. This provides an interference fit between the disc 210 and the seal 212 which is typically between fifteen and thirty-five thousands of all inch (0.015"-0.035") measured at an infinitesimal sector or arc. Constructing a valve 206 that incorporates this tolerance profile is well known in the art, although due to the configuration of the disclosed embodiments the amount of the interference is not uniform around the periphery of the disc 210 prior to closure.

During closure, the seal minor axis 234 (illustrated in FIG. 11) is elongated by the disc 210, and the seal major axis 232 is reduced much like pulling on two ends of an annual rubber band. Thus, in the open position the seal minor axis 234 has a greater than normal interference with the disc major axis 236, and as the plug major axis 236 approaches closure and contacts the seal 212, the seal 212 elongates along the minor axis 234 and contracts along the major axis 232 to conform to the disc 210 shape. When the disc 210 substantially closes the passageway, the contact between the valve seal major axis 232 and the disc minor axis 238 forces more seal to disc 210 contact until contact between the valve seal major axis 232 and the disc minor axis 238 substantially seals the passage. For example, when the disc 210 is within approximately three degrees (3°) of closure, measured from the axis of the seal 212, the valve seal 212 may still provide clearance, and as the disc 210 engages the seal 212 approximately two degrees (0°) from closure, the seal 212 substantially engages the disc 210 proximate to the shaft 216 and at zero degrees (0°) seals around the entire circumference of the disc 210.

The present invention also provides for frictionless operation between the disc 210 and the seal 212 when the valve 206 is used for throttling and operating at more than, or example, 5% flow capacity. Since the seal 212 does not contact the disc 210 there is no resulting friction in the "typical" operating range. Thus an actuator (not shown) will not be affected by breakaway friction.

The foregoing detailed description is to be clearly understood as being given by way of illustration of the preferred embodiments of this invention. Various modifications and additions can be made without departing from the spirit and scope of this invention. For example, a flat plate disc is shown, but other shapes and sizes of discs, such as cylinders, voids, or hemispherical plates can be substituted where appropriate.

Further, the seal structures described herein may be manufactured from PTFE or a variety of reinforced PTFE materials, including but not limited to: carbon filled PTFE, glass tilled PTFE, PEEK filled PTFE, DYNEON™, TFM™ and polyethylene (ultra high modular weight). Likewise, each of the components described herein can be constructed as a fixed portion of the valve casing or can be made adjustable and removable. Accordingly, this description is meant to be taken only by way of example and not to otherwise limit the scope of the invention. The spirit and scope of the present invention are limited solely by the claims.

What is claimed is:

1. A valve having reduced seal wear and reduced friction comprising:
   a valve body having an inlet and an outlet forming a passage in the valve body, and a reverse-flow side recess;
   a valve stem extending into the valve body;
   a disc rotatable by the valve stem to open and close the passage, the disc having a perimeter;
   a valve seal having an elliptical first shape with a major axis greater than a minor axis, the valve seal deforming through contact with the disc as the disc rotates to a closed position to a second shape different from the first shape in which the valve seal substantially contacts the disc perimeter, thereby to substantially close the passage, wherein the valve seal is formed of a resilient material that substantially returns to the first shape when the disc subsequently moves back toward an open position, wherein the valve seal includes a peripheral portion; and
   a press-fit seal retainer in an interference fit with the reverse-flow side recess, the peripheral portion of the valve seal received in a complementary receiving portion of the press-fit seal retainer.

2. The valve of claim 1, wherein the press-fit seal retainer has an outer diameter larger than an inner diameter of the reverse-flow side recess.

3. The valve of claim 1, wherein the valve seal cooperates with a resilient spring positioned to resist outward radial forces generated by movement of the sealing periphery of the disc relative to a sealing surface of the valve seal.

4. The valve of claim 2, wherein the resilient spring is a flat spring encapsulated within the valve seal and positioned generally parallel to the disc when the disc is in the closed position.

5. The valve of claim 4, wherein the resilient spring is formed substantially parallel to the receiving portion of the press-fit seal retainer.

6. The valve of claim 1, wherein each of the peripheral portion of the valve seal and the receiving portion of the press-fit seal retainer is substantially rectangular.

7. The valve of claim 1, wherein the valve seal further includes a gasket portion extending from the peripheral portion, and the press-fit seal retainer further includes a retaining ridge to provide controlled compression of the gasket portion of the seal member.

8. The valve of claim 1, wherein the valve seal includes a retaining ridge securely received in a complementary recess in the valve body to provide additional retention of the press-fit seal retainer relative to the valve body.

* * * * *

UNITED STATES PATENT AND TRADEMARK OFFICE
CERTIFICATE OF CORRECTION

| | |
|---|---|
| PATENT NO. | : 7,416,164 B2 |
| APPLICATION NO. | : 11/866854 |
| DATED | : August 26, 2008 |
| INVENTOR(S) | : Philip W. Eggleston et al. |

It is certified that error appears in the above-identified patent and that said Letters Patent is hereby corrected as shown below:

At Column 1, line 26, "(low" should be -- flow --.

At Column 2, line 5, "(disc" should be -- disc --.

At Column 2, line 31, "away", friction" should be -- away" friction --.

At Column 2, line 32, "friction)" should be -- friction --.

At Column 2, line 41, "control," should be -- control --.

At Column 3, line 49, "closure" should be -- closure, --.

At Column 3, line 67, "ii" should be -- in --.

At Column 4, line 25, "sedge" should be -- ridge --.

At Column 4, line 50, "am" should be -- an --.

At Column 6, line 65, "shaft," should be -- shaft --.

At Column 6, line 67, "26a," should be -- 26a --.

At Column 7, line 1, "glide" should be -- guide --.

At Column 7, line 56, "mid" should be -- and --.

At Column 8, line 32, "seal," should be -- seal --.

At Column 8, line 42, "con figuration" should be -- configuration --.

At Column 9, line 2, "stricture" should be -- structure --.

At Column 9, line 13, "portion," should be -- portion --.

At Column 10, line 20, "seal," should be -- seal --.

At Column 10, line 26, "geometry 10" should be -- geometry --.

At Column 10, line 39, "Support" should be -- support --.

At Column 10, line 40, "between," should be -- between --.

At Column 10, line 63, "formed," should be -- formed --.

UNITED STATES PATENT AND TRADEMARK OFFICE
CERTIFICATE OF CORRECTION

PATENT NO. : 7,416,164 B2
APPLICATION NO. : 11/866854
DATED : August 26, 2008
INVENTOR(S) : Philip W. Eggleston et al.

It is certified that error appears in the above-identified patent and that said Letters Patent is hereby corrected as shown below:

At Column 11, line 3, "ala" should be -- an --.

At Column 11, line 27, "seal," should be -- seal --.

At Column 11, line 41, "press-lit" should be -- press-fit --.

At Column 11, line 48, "am" should be -- arm --.

At Column 14, line 56, "or" should be -- for --.

At Column 15, line 3, "tilled" should be -- filled --.

Signed and Sealed this

Thirty-first Day of March, 2009

JOHN DOLL
*Acting Director of the United States Patent and Trademark Office*